E. G. PASSMORE.

Lawn-Mower.

No. 6,305. Reissued Feb. 23, 1875.

Witnesses.

Horace Binney, 3rd.

Thos Duke.

Inventor.

Everett G. Passmore

UNITED STATES PATENT OFFICE.

EVERETT G. PASSMORE, OF PHILADELPHIA, PENNSYLVANIA.

IMPROVEMENT IN LAWN-MOWERS.

Specification forming part of Letters Patent No. 87,286, dated February 23, 1869; reissue No. 6,305, dated February 23, 1875; application filed October 24, 1874.

*To all whom it may concern:*

Be it known that I, EVERETT G. PASSMORE, of the city and county of Philadelphia, in the State of Pennsylvania, have invented a new and useful Improvement in Lawn-Mowers; and I do hereby declare the following to be a full, clear, and exact description thereof, which will enable others skilled in the art to which it appertains to make and use the said invention, reference being had to the accompanying drawing, which forms a part of this specification, and in which—

Figure 2:
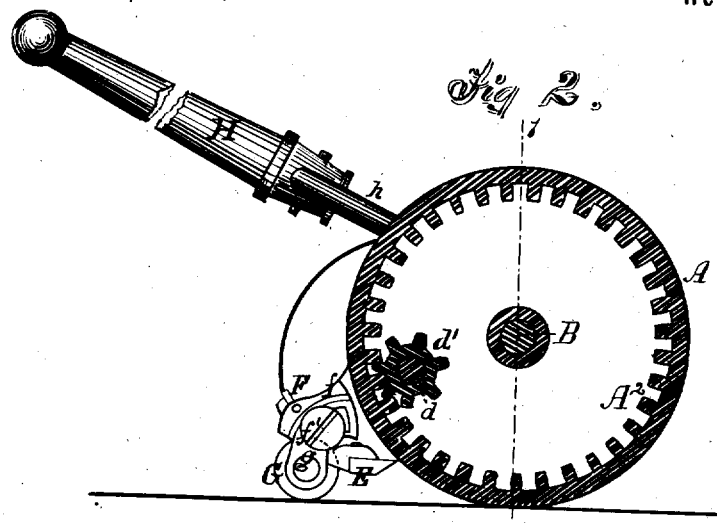
Figure 6:
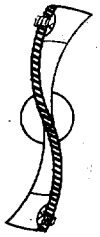
Figure 1:
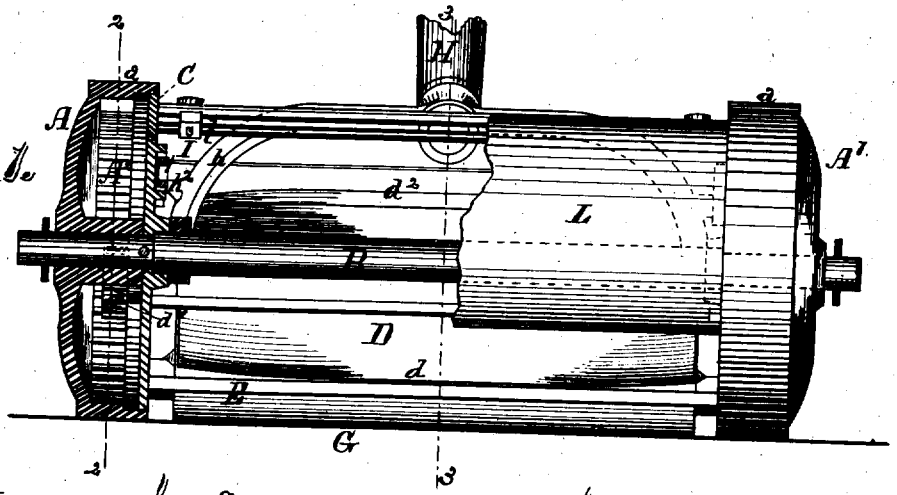
Figure 3:
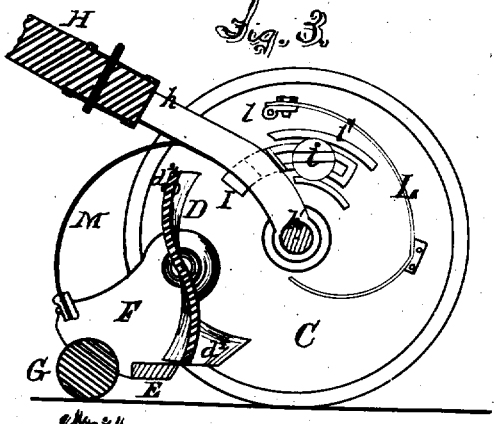
Figure 4:
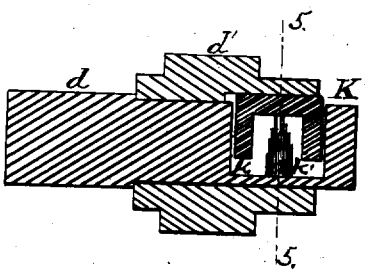
Figure 5:
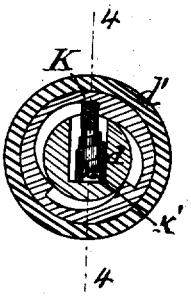

Figure 1 is a front view of my improved machine, partly in section, on the line 1 1, Fig. 2. Fig. 2 is a vertical transverse section on the line 2 2, Fig. 1. Fig. 3 is a similar section on the line 3 3, Fig. 1. Fig. 4 is a longitudinal section through the backing-ratchet on the line 4 4, Fig. 5. Fig. 5 is a transverse section of the same on the line 5 5, Fig. 4; and Fig. 6 is a vertical transverse section through the revolving cutter.

The same parts are denoted by the same letters in all the figures.

This invention consists, first, in the combination, in a lawn-mowing machine, of a horizontal straight-edged stationary cutter, and a spiral cutter revolved on a horizontal axis by means of a train of gearing which is actuated by the carrying-wheels of the machine, and inclosed by said wheels and by side plates; secondly, in the combination, in a lawn-mowing machine, of a horizontal straight-edged stationary cutter, and a spiral cutter revolving on a horizontal axis, and located between two driving-wheels, which actuate it by means of a train of gearing inclosed by said wheels, and by side plates; thirdly, in the combination, in a lawn-mowing machine, of side plates mounted on the main axle, and fitting into the rims of the driving-wheels, with a rotary and a stationary cutter, which are both supported on the said side plates; fourthly, in the combination, in a lawn-mowing machine, of two driving-wheels, cutters arranged between said wheels, and side plates mounted on the axle, and fitting into the rims of said wheels; fifthly, in the combination of two driving-wheels, carrying internal spur-wheels and turning loosely on the main axle, side plates fixed on said axle and fitting into the driving-wheels, and a rotary cutter arranged between the wheels on a shaft projecting through the side plates, and carrying pinions meshing into the driving-gears; sixthly, in the combination of two driving-wheels turning loosely on the main axle, and side plates fixed on said axle, with a tongue hinged loosely on said axle, and locking into adjustable lugs or stops on the side plates, whereby the cutting apparatus may be raised or lowered.

A $A^1$ in the drawing are two driving-wheels, running loosely on a common axle, B. These wheels are cast with an inwardly-projecting flange, *a*, and with internally-geared spur-wheels $A^2$. Upon the axle B are keyed plates C F, of irregular form, the circular part C of each plate fitting snugly in the flange of the wheel, while the part F projects beyond the periphery of the wheel. These plates do not fit so tightly into the wheels as to prevent them from turning on the axle, which, as well as the plates, remains fixed. These plates, being thus each arranged so as to cover that side of the gearing which is not covered by the wheel, operate to protect the gearing from the cut grass, which would otherwise clog it. A rotary cutter, consisting of a spiral blade, D, turns on trunnions *d*, projecting through the side plates, and carrying spur-pinions $d^1$, which mesh into the driving-gears $A^2$. The cutter-blades are made of thin steel strips $d^2$, bolted to the cast-iron body D in such manner that the strips may be set to project farther from the body as their edges wear away. This construction enables the blades easily to be removed, replaced, or sharpened. A horizontal straight-edged stationary blade, E, is secured to the parts F of the side plates which project beyond the wheels. A roller, G, to sustain this cutter at a uniform height above the ground, is mounted in short curved arms *g*, sliding endwise in correspondingly-curved guides *f*. The arms *g* are slotted at their upper ends, and may be adjusted to raise or lower the cutters by means of set-screws $f^1$. The tongue H is forked, and its forks *h* are provided with loops $h^1$, which fit the axle, so that the tongue can play vertically independently of the axle. Lugs $h^2$ on the forks of the tongue play in recesses in lugs I on the side plates C F. These lugs are curved and slotted, and play endwise in guides $i'$ on the side plates C F, and are adjusted by set-screws $i$, as shown in Fig. 3, in order to set the tongue higher or lower. The tongue is allowed slight vertical play in these lugs, also. In order that the gearing may stop when the machine is backed, I form a recess, $k$, in the shaft which drives the cutters—in this instance the trunnions $d$. This shaft runs inside of the driven pinion $d^1$, or of a shaft on which the pinion is mounted, the inside being formed into ratchets, as shown in Fig. 5. A yoke or pawl, K, plays radially to the shaft, and is pressed outward by a spring, $k'$; consequently, when the shaft turns forward, the pawl catches against the ratchets, and drives the cutters, but slips over them when backed, in the usual way. The pawl is thus out of sight, protected from injury, and yet is accessible at any time merely by slipping the pinion from the shaft. To form a receptacle for the cut grass, I provide a cover, L, of sheet metal, with eyes at its upper edge to receive a rod, $l$, which enters holes in the side plates C F, and thus forms a hinge for the cover. The cover is curved, as shown in Fig. 3, so that its lower edge rests near the axle B. Another cover, M, is provided with points at its corners, so that they may be sprung into holes in the side plates C F and lugs F, and securely hold the cover in place.

In operation the workman seizes the handle and pushes the machine before him. The rotary cutters shear off the grass as it comes against the fixed cutter E, and throw it over the axle into the receptacle formed by the case L.

What I claim as my invention, and desire to secure by Letters Patent, is—

1. The combination, in a lawn-mowing machine, of a horizontal straight-edged stationary cutter, and a spiral cutter revolved on a horizontal axis by means of a train of gearing which is actuated by the carrying-wheels of the machine, and inclosed by said wheels and by side plates.

2. The combination, in a lawn-mowing machine, of a horizontal straight-edged stationary cutter, and a spiral cutter revolving on a horizontal axis, and located between two driving-wheels, which actuate it by means of a train of gearing inclosed by said wheels and by side plates.

3. The combination, in a lawn-mowing machine, of side plates mounted on the main axle, and fitting into the rims of the driving-wheels, with a rotary and a stationary cutter, which are both supported on the side plates.

4. The combination, in a lawn-mowing machine, of two driving-wheels, cutters arranged between said wheels, and side plates mounted on the axle, and fitting into the rims of said wheels.

5. The combination, substantially as set forth, of loose driving-wheels, internal gears, fixed side plates, rotary cutters, and pinions mounted directly on the cutter-shaft.

6. The combination, substantially as set forth, of loose driving-wheels, fixed side plates, a tongue hinged on the axle, and stops on the side plate.

EVERETT G. PASSMORE.

Witnesses:
HORACE BINNEY, 3d,
THOS. DUKE.